United States Patent
Fan et al.

(10) Patent No.: US 11,178,688 B2
(45) Date of Patent: Nov. 16, 2021

(54) METHOD, BASE STATION AND USER EQUIPMENT FOR UPLINK TRANSMISSION AND CONTROL THEREOF

(71) Applicant: Telefonaktiebolaget LM Ericsson (publ), Stockholm (SE)

(72) Inventors: Rui Fan, Beijing (CN); Jinhua Liu, Beijing (CN); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 16/620,944

(22) PCT Filed: Jun. 21, 2017

(86) PCT No.: PCT/CN2017/089328
§ 371 (c)(1),
(2) Date: Dec. 10, 2019

(87) PCT Pub. No.: WO2018/232620
PCT Pub. Date: Dec. 27, 2018

(65) Prior Publication Data
US 2020/0196348 A1    Jun. 18, 2020

(51) Int. Cl.
*H04W 4/00* (2018.01)
*H04W 72/14* (2009.01)
(Continued)

(52) U.S. Cl.
CPC ............ *H04W 72/14* (2013.01); *H04L 1/0003* (2013.01); *H04L 1/08* (2013.01); *H04W 72/1268* (2013.01)

(58) Field of Classification Search
CPC ............. H04W 72/14; H04W 72/1268; H04W 72/1289; H04W 80/04; H04W 88/06;
(Continued)

(56) References Cited

U.S. PATENT DOCUMENTS

2011/0090806 A1* 4/2011 Ozturk ................. H04L 1/0017
370/252
2012/0269148 A1* 10/2012 Hultell .............. H04W 72/0406
370/329
(Continued)

FOREIGN PATENT DOCUMENTS

CN        101715237 A    5/2010
CN        102651679 A    8/2012
(Continued)

OTHER PUBLICATIONS

Communication Regarding European Search Report for European Patent Application No. 17914277.3 dated Nov. 16, 2020.
(Continued)

*Primary Examiner* — Chuong T Ho
(74) *Attorney, Agent, or Firm* — Sage Patent Group

(57) ABSTRACT

Method, base station and user equipment are disclosed for uplink transmission and control thereof. A base station transmits to a user equipment a first grant that schedules a first uplink transmission in a first at least one subframe over a first carrier. In response to a trigger event, the base station determines a second grant that schedules a second uplink transmission over the first carrier. The base station transmits the second grant to the UE over a second carrier that has a different frequency than the first carrier.

16 Claims, 10 Drawing Sheets

(51) Int. Cl.
*H04L 1/00* (2006.01)
*H04L 1/08* (2006.01)
*H04W 72/12* (2009.01)

(58) Field of Classification Search
CPC ..... H04W 88/08; H04W 28/04; H04W 72/04; H04W 72/0446; H04L 1/0003; H04L 1/08; H04L 5/0007
USPC .................................................. 370/329, 330
See application file for complete search history.

(56) References Cited

U.S. PATENT DOCUMENTS

| | | |
|---|---|---|
| 2014/0010067 A1 | 1/2014 | Guan et al. |
| 2014/0022964 A1 | 1/2014 | Guan et al. |
| 2014/0187165 A1* | 7/2014 | Wu ................... H04W 28/0278 455/41.2 |
| 2015/0264662 A1 | 9/2015 | Sahlin et al. |
| 2016/0095134 A1* | 3/2016 | Chen ..................... H04L 1/1822 370/336 |
| 2016/0278118 A1 | 9/2016 | Yerramalli et al. |
| 2017/0150367 A1 | 5/2017 | Han et al. |
| 2017/0181159 A1* | 6/2017 | Zacharias ............. H04L 5/0098 |
| 2017/0290048 A1* | 10/2017 | Amuru .............. H04W 74/0808 |
| 2017/0374686 A1* | 12/2017 | Agarwal ........... H04W 74/0833 |
| 2018/0367282 A1 | 12/2018 | Li et al. |
| 2019/0229877 A1* | 7/2019 | Tumula ................ H04L 1/1819 |

FOREIGN PATENT DOCUMENTS

| | | |
|---|---|---|
| CN | 102843771 A | 12/2012 |
| EP | 3148108 A1 | 3/2017 |
| WO | 2015188557 A1 | 12/2015 |
| WO | 2017076157 A1 | 5/2017 |

OTHER PUBLICATIONS

International Search Report and Written Opinion of the International Searching Authority for PCT International Application No. PCT/CN2017/089328 dated Feb. 26, 2018.

* cited by examiner

METHOD, BASE STATION AND USER EQUIPMENT FOR UPLINK TRANSMISSION AND CONTROL THEREOF

CROSS REFERENCE TO RELATED APPLICATION

This application is a 35 U.S.C. § 371 national stage application of PCT International Application No. PCT/CN2017/089328, filed on Jun. 21, 2017, the disclosure and content of which is incorporated herein by reference in its entirety.

TECHNICAL FIELD

Embodiments of the disclosure generally relate to wireless communication, and, more particularly, to method, base station and user equipment for uplink transmission and control thereof.

BACKGROUND

Unlicensed spectrum refers to radio frequency bands in which technical rules are specified for both the hardware and deployment of radio systems that are open for shared use by an unlimited number of compliant users. For various wireless communication systems operated in the shared unlicensed spectrum such as 2.4 GHz and 5 GHz, carrier sensing scheme is used. That is, before accessing a channel (or carrier) by a wireless communication system, the wireless communication system shall firstly determine the channel is available via sensing the channel. If the channel is determined as unavailable, the wireless communication system shall not access the channel. Carrier sensing may also be interchangeably referred to as listen before talk (LBT) hereinafter.

For example, in typical deployments of wireless local area network (WLAN), carrier sense multiple access with collision avoidance (CSMA/CA) is used for medium access. This means that the channel is sensed to perform a clear channel assessment (CCA) and a transmission is initiated only if the channel is declared as idle. In case the channel is declared as busy, the transmission is essentially deferred until the channel is deemed to be idle. When the ranges of several access points (APs) using the same frequency overlap, this means that all transmissions related to one AP might be deferred in case a transmission on the same frequency to or from another AP which is within range can be detected. This further means that if several APs are within range, they will have to share the channel in time and the throughput for the individual APs may be degraded compared to their isolated deployments.

In wireless fidelity (WiFi) system as an example of WLAN, after a WiFi station A transmits a data frame to a station B, the station B shall transmit an acknowledgement (ACK) frame back to the station A with a delay of 16 μs. Such an ACK frame is transmitted by the station B without performing a LBT operation. To prevent another station interfering with such an ACK frame transmission, a station shall defer for a duration of 34 μs, which is referred to as distributed inter-frame spacing (DIFS), after the channel is observed to be occupied before a subsequent attempt to assess again whether or not the channel is occupied. Therefore, a station that wishes to transmit shall firstly perform a CCA by sensing the medium for a fixed duration DIFS. If the medium is found to be idle, the station shall assume that it may take ownership of the medium and begin a frame exchange sequence. If the medium is busy, the station shall wait for the medium to go idle, defer for DIFS, and wait for a further random backoff period. To further prevent a station from occupying the channel continuously, if a station wishes to transmit again after a transmission is completed, it is required for the station to perform a random backoff.

With the rapidly growing demand of wireless network services, mobile network operators have made some efforts to explore unlicensed spectrum to offload data traffic from licensed spectrum. One of the options to achieve this end is long term evolution-license assisted access (LTE-LAA), which has been specified in the technical specification of the 3rd generation partnership project (3GPP). In LAA system, the licensed spectrum is used as a primary cell (Pcell) to deliver critical information and guaranteed quality of service and the unlicensed spectrum is used as a secondary cell (Scell) to opportunistically boost data rate.

In order to achieve coexistence between LAA and WiFi systems, LBT needs to be performed. Specifically, an evolved node B (eNB) may transmit a transmission including physical downlink shared channel/physical downlink control channel/enhanced physical downlink control channel (PDSCH/PDCCH/EPDCCH) on a channel on which LAA Scell(s) transmission(s) are performed, after first sensing the channel to be idle during the slot durations of a defer duration $T_d$; and after the counter N is zero in step 4 described below. The counter N is adjusted by sensing the channel for additional slot duration(s) according to the steps below:

1) Set $N=N_{init}$, where $N_{init}$ is a random number uniformly distributed between 0 and $CW_p$, and go to step 4;
2) If N>0 and the eNB chooses to decrement the counter, set N=N−1;
3) Sense the channel for an additional slot duration, and if the additional slot duration is idle, go to step 4; else, go to step 5;
4) If N=0, stop; else, go to step 2;
5) Sense the channel until either a busy slot is detected within an additional defer duration $T_d$ or all the slots of the additional defer duration $T_d$ are detected to be idle;
6) If the channel is sensed to be idle during all the slot durations of the additional defer duration $T_d$, go to step 4; else, go to step 5.

In the procedure described above, the parameter $CW_p$ is the contention window and satisfies $C_{min,p} \leq CW_p \leq CW_{max,p}$. The defer duration $T_d$ consists of duration $T_f=16$ μs immediately followed by $m_p$ consecutive slot durations where each slot duration is $T_{sl}=9$ μs, and $T_f$ includes an idle slot duration $T_{sl}$ at start of $T_f$. The parameters $m_p$, $C_{min,p}$ and $C_{max,p}$ are based on channel access priority class p associated with the eNB transmission. In order to prevent an eNB from occupying the channel continuously, the eNB shall not continuously transmit on a channel on which the LAA Scell(s) transmission(s) are performed, for a period exceeding $T_{m\_cot,p}$, where the subscript "mcot" refers to maximum channel occupation time. The following table shows, for different values of p, their corresponding parameter values.

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

For p=3 and p=4, if the absence of any other technology sharing the carrier can be guaranteed on a long term basis (e.g. by level of regulation), $T_{m\ cot,p}$=10 ms, otherwise, $T_{m\ cot,p}$=8 ms.

FIG. 1 shows the LBT scheme for uplink data transmission over unlicensed carrier in LAA system. As shown, the length of a subframe is 1 ms and there is a duration of around 3 ms between the uplink (UL) grant receiving and the occurrence of the UL data transmission. Referring to the backoff size generated according to the parameters in the above table, this interval is long enough for a user equipment (UE) to perform LBT for the scheduled UL data transmission by the received UL grant. Hence, the UE can start the LBT after the grant receiving.

Recently, 5G new radio (NR) technologies have been developed. Unlicensed operation will be one key part for NR system as well. Similar to LTE-LAA, for unlicensed operation, the NR system will be operated in unlicensed spectrum which is shared by various wireless communication systems. Thus, harmonious spectrum sharing scheme with acceptable complexity for both standardization and system design shall be preferred to ensure different systems can operate well. However, there are some changes made in NR system compared to LTE. This results in that some solutions in LTE might not suit NR very well, for example in the scenario of UL transmission shown in FIG. 1. Therefore, it would be desirable to provide a solution for uplink transmission and control thereof in NR system.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

One of the objects of the disclosure is to provide a solution for uplink transmission and control thereof in NR system.

According to one aspect of the disclosure, it is provided a method for uplink transmission control at a base station (BS). The method comprises transmitting to a user equipment (UE) a first grant that schedules a first uplink transmission in a first at least one subframe over a first carrier. The method further comprises, in response to a trigger event, determining a second grant that schedules a second uplink transmission over the first carrier. The method further comprises transmitting the second grant to the UE over a second carrier that has a different frequency than the first carrier.

In an embodiment of the disclosure, the second grant is configured to override the first grant when the two grants conflict with each other.

In an embodiment of the disclosure, the determining a second grant and the transmitting the second grant are performed one or more times. The first uplink transmission and the one or more second uplink transmissions are scheduled to be within a same maximum channel occupation time (MCOT).

In an embodiment of the disclosure, the trigger event is detection of a transmission error for a packet during reception of the first uplink transmission. The step of determining comprises determining the second grant that schedules a retransmission for the packet in a subframe that is subsequent to the detection.

In an embodiment of the disclosure, the trigger event is reception from the UE of a message indicating that the UE has additional data to transmit. The step of determining comprises determining the second grant that schedules the second uplink transmission in a second at least one subframe that is subsequent to the first at least one subframe.

In an embodiment of the disclosure, the trigger event is detection of a change in radio link quality between the UE and the BS during reception of the first uplink transmission. The step of determining comprises determining the second grant that schedules the second uplink transmission with an updated modulation and coding scheme (MSC) in a third at least one subframe.

In an embodiment of the disclosure, both the first and second carriers have licensed frequencies. Alternatively, the first carrier has an unlicensed frequency and the second carrier has a licensed frequency.

According to another aspect of the disclosure, it is provided a method for uplink transmission at a user equipment (UE). The method comprises performing a first uplink transmission based on a first grant from a base station (BS). The first grant schedules the UE to transmit in a first at least one subframe over a first carrier. The method further comprises receiving a second grant from the BS over a second carrier that has a different frequency than the first carrier. The second grant schedules the UE to transmit over the first carrier. The method further comprises performing a second uplink transmission based on the second grant.

In an embodiment of the disclosure, the second uplink transmission is performed instead of the first uplink transmission when the first and second grants conflict with each other.

In an embodiment of the disclosure, the receiving a second grant and the performing a second uplink transmission are performed one or more times. The first uplink transmission and the one or more second uplink transmissions are performed within a same maximum channel occupation time (MCOT).

In an embodiment of the disclosure, the second grant schedules a retransmission for a packet in a subframe. Performing the second uplink transmission based on the second grant comprises retransmitting the packet in the subframe.

In an embodiment of the disclosure, the method further comprises transmitting to the BS a message indicating that the UE has additional data to transmit. The second grant schedules the UE to transmit in a second at least one subframe that is subsequent to the first at least one subframe. Performing the second uplink transmission based on the second grant comprises transmitting the additional data in the second at least one subframe.

In an embodiment of the disclosure, the second grant schedules the UE to transmit with an updated modulation and coding scheme (MSC) in a third at least one subframe. Performing the second uplink transmission based on the second grant comprises transmitting with the updated MSC in the third at least one subframe.

In an embodiment of the disclosure, both the first and second carriers have licensed frequencies. Alternatively, the first carrier has an unlicensed frequency and the second carrier has a licensed frequency.

According to another aspect of the disclosure, it is provided a base station (BS) capable of uplink transmission control. The BS comprises a processor and a memory. The memory contains instructions executable by the processor, whereby the BS is operative to transmit to a user equipment (UE) a first grant that schedules a first uplink transmission in a first at least one subframe over a first carrier. The BS is further operative to, in response to a trigger event, determine a second grant that schedules a second uplink transmission over the first carrier. The BS is further operative to transmit the second grant to the UE over a second carrier that has a different frequency than the first carrier.

According to another aspect of the disclosure, it is provided a user equipment (UE) capable of uplink transmission. The UE comprises a processor and a memory. The memory contains instructions executable by the processor, whereby the UE is operative to perform a first uplink transmission based on a first grant from a base station (BS). The first grant schedules the UE to transmit in a first at least one subframe over a first carrier. The UE is further operative to receive a second grant from the BS over a second carrier that has a different frequency than the first carrier. The second grant schedules the UE to transmit over the first carrier. The UE is further operative to perform a second uplink transmission based on the second grant.

According to another aspect of the disclosure, it is provided a computer program product. The computer program product comprises instructions which when executed by at least one processor, cause the at least one processor to perform the method according to the above aspect.

According to another aspect of the disclosure, it is provided a computer readable storage medium. The computer readable storage medium comprises instructions which when executed by at least one processor, cause the at least one processor to perform the method according to the above aspect.

According to another aspect of the disclosure, it is provided a base station (BS) capable of uplink transmission control. The BS comprises a first transmission module for transmitting to a user equipment (UE) a first grant that schedules a first uplink transmission in a first at least one subframe over a first carrier. The BS further comprises a determination module for, in response to a trigger event, determining a second grant that schedules a second uplink transmission over the first carrier. The BS further comprises a second transmission module for transmitting the second grant to the UE over a second carrier that has a different frequency than the first carrier.

According to another aspect of the disclosure, it is provided a user equipment (UE) capable of uplink transmission. The UE comprises a first uplink transmission module for performing a first uplink transmission based on a first grant from a base station (BS). The first grant schedules the UE to transmit in a first at least one subframe over a first carrier. The UE further comprises a reception module for receiving a second grant from the BS over a second carrier that has a different frequency than the first carrier. The second grant schedules the UE to transmit over the first carrier. The UE further comprises a second uplink transmission module for performing a second uplink transmission based on the second grant.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Similar to LTE, for unlicensed operation in NR, in order to keep fairness with other systems such as WiFi, it is required for a transmitter to do LBT before it can transmit. Once the LBT succeeds, there is also a requirement on maximum channel occupation time (MCOT). It means the time during which a transmission can be continuously performed after a successful LBT. The transmitter has to do another regular LBT if the transmission duration exceeds the MCOT from the time point when a regular LBT is performed. Even within one MCOT, a short LBT is still needed if the transmission is not continuous.

Figure 1:
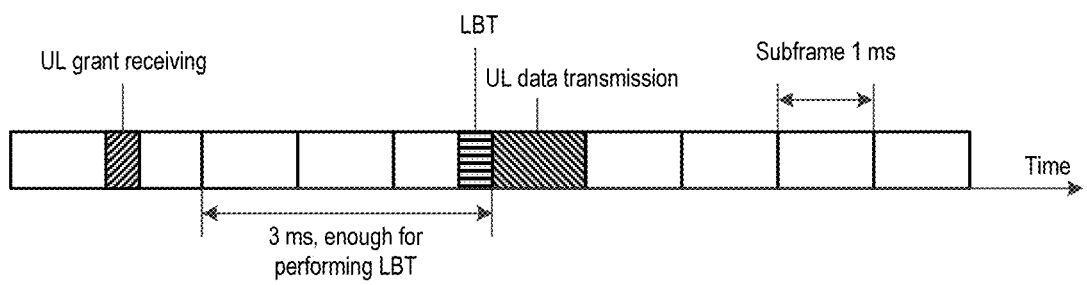
FIG. 1 shows the LBT scheme for uplink data transmission in LAA system.
Figure 2:
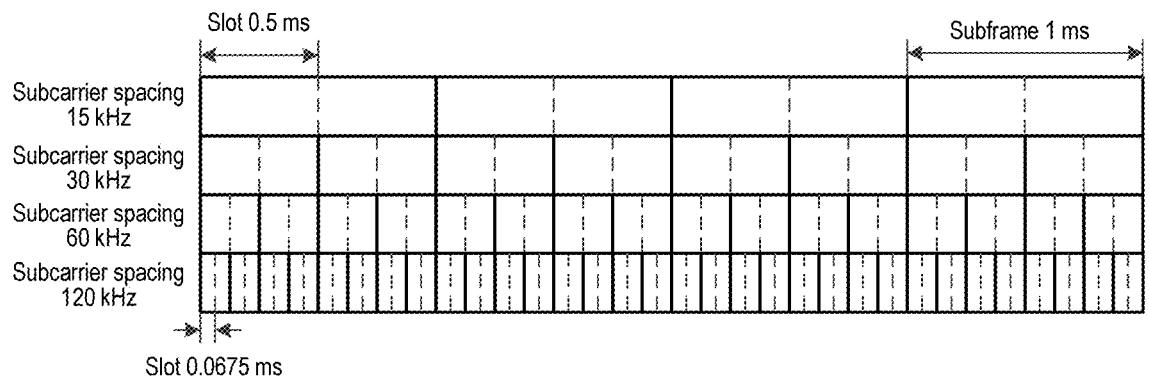
FIG. 2 shows the possible timing configuration in NR system.

Compared to LTE, the timing for NR will be very tight even when the same subcarrier spacing is used as LTE. For unlicensed operation, the subcarrier spacing could be larger than 15 kHz for NR. FIG. 2 shows the possible timing configuration in NR system. As shown, the subcarrier spacing could be one or more of 30 kHz, 60 kHz and 120 kHz, since it has not been discussed sufficiently in 3GPP yet. Correspondingly, the slot lengths (½ subframe) are 250 μs, 125 μs and 67.5 μs. For subcarrier spacing of 120 kHz, the slot with 7 orthogonal frequency division multiplexing (OFDM) symbols has a length of around 67.5 μs.

Since the length of a subframe is shortened in NR compared to LTE, if a UE is still scheduled with a single subframe for each UL transmission in NR, a large number of LBT operations will be required during the UL transmission. In order to reduce the number of LBT operations, NR supports multi-subframe scheduling in UL. That is, in one UL grant, the network (NW) can schedule multiple UL subframes for a UE. Then once the UE grabs the channel, the UE can transmit in UL continuously for several subframes.

This helps increasing spectrum utilization in unlicensed carrier, compared to doing LBT for each UL transmission in each subframe.

In the case of the multi-subframe scheduling for NR, traditional solutions for LTE have the following problems. Firstly, when there is a transmission error in UL, the NW can only schedule a UE to do retransmission when the UE has finished the multi-subframe transmission. The NW needs to do a LBT before it sends a grant to the UE. The UE has to do another LBT before it can retransmit the error packet. During these periods, the channel may be grabbed by other UEs. Then, the rest of the MCOT cannot be used. Furthermore, the large retransmission delay due to the multiple-subframe scheduling reduces the probability of soft combining due to lack of soft memory in the UE, and deteriorates the packet disorder at the receiver side. The packet disorder will slow the rate increase at slow start phase.

Secondly, if a UE has more data to transmit after the NW has already sent a UL grant to the UE, the NW has to schedule the UE after the UE finishes the uplink transmission, even though there are still some unscheduled time-frequency resources during the current MCOT. Then the NW needs to do another LBT before it sends a grant to the UE. The UE has to do another LBT before it can transmit new packets. During these periods, the channel may be grabbed by other UEs so that the rest of the MCOT cannot be used.

The present disclosure proposes a plurality of schemes for uplink transmission and control thereof in NR system. They may overcome at least one of the drawbacks mentioned above, or they may not overcome any one of the drawbacks mentioned above. These schemes can be applied to a wireless communication system comprising a base station (BS) supporting communication related services in a coverage area (also referred to as a cell). The BS is also capable of communicating with at least one UE within the coverage area. The communications between the BS and the at least one UE may employ any wireless communication standards such as CDMA, TDMA, FDMA, OFDMA and so on. The BS may be, for example, a gNB in NR. The UE may be referred to as, for example, device, mobile station, mobile unit, subscriber station, wireless terminal, terminal, or the like. The UE may be mobile or stationary, and may be, for example, a wireless handheld device such as a wireless phone, a computer with a wireless connection to a network, a wireless plug-in accessory, or the like. Hereinafter, the schemes will be described in detail with reference to FIGS. 3-5. In these figures, there are two entities, i.e. a NW and a UE. The NW can be represented by a BS such as a gNB in NR. The term "NR-U" means "NR-unlicensed".

Figure 3A:
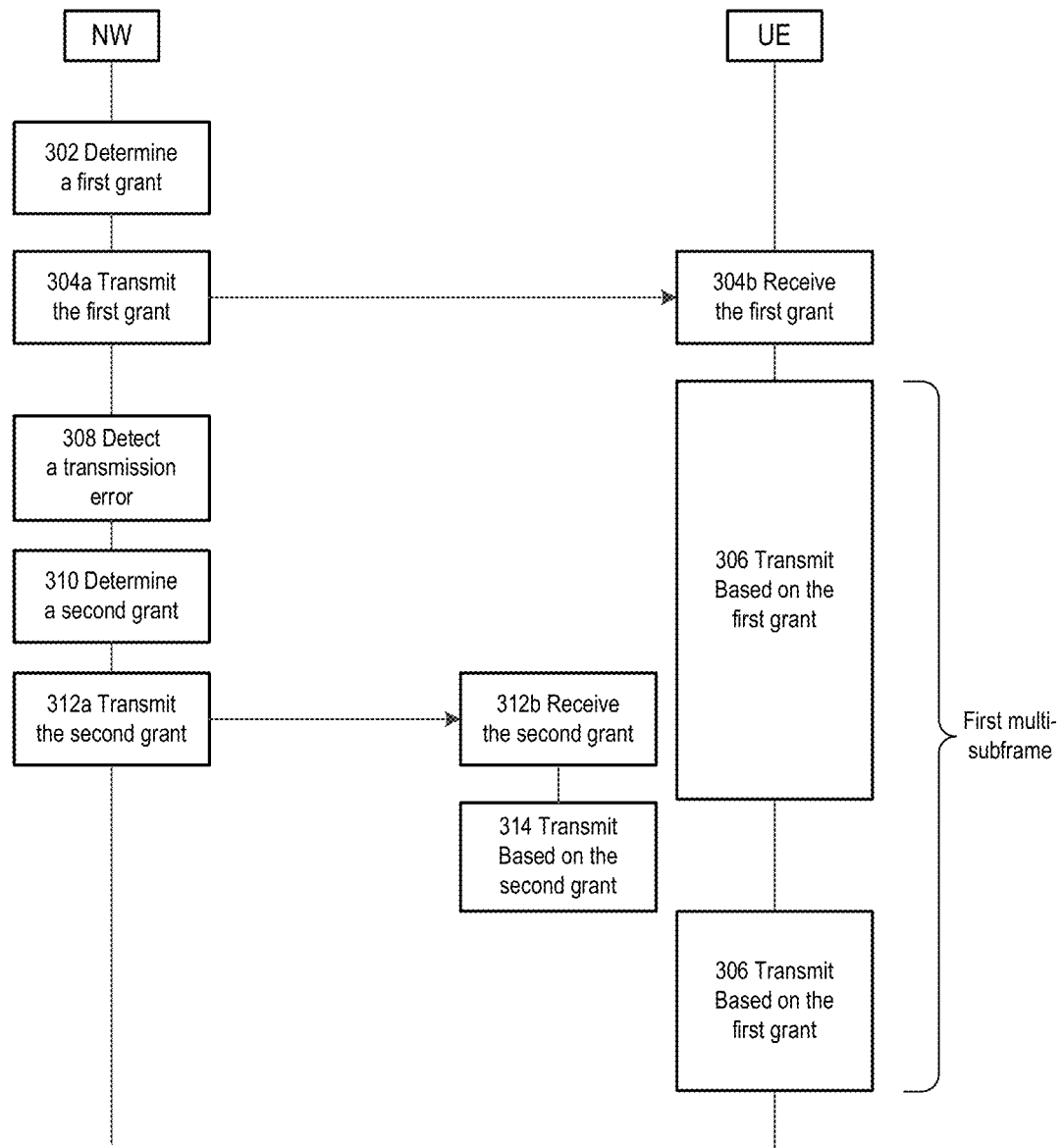
FIGS. 3A and 3B are diagrams illustrating a first scheme of the disclosure.
Figure 3B:
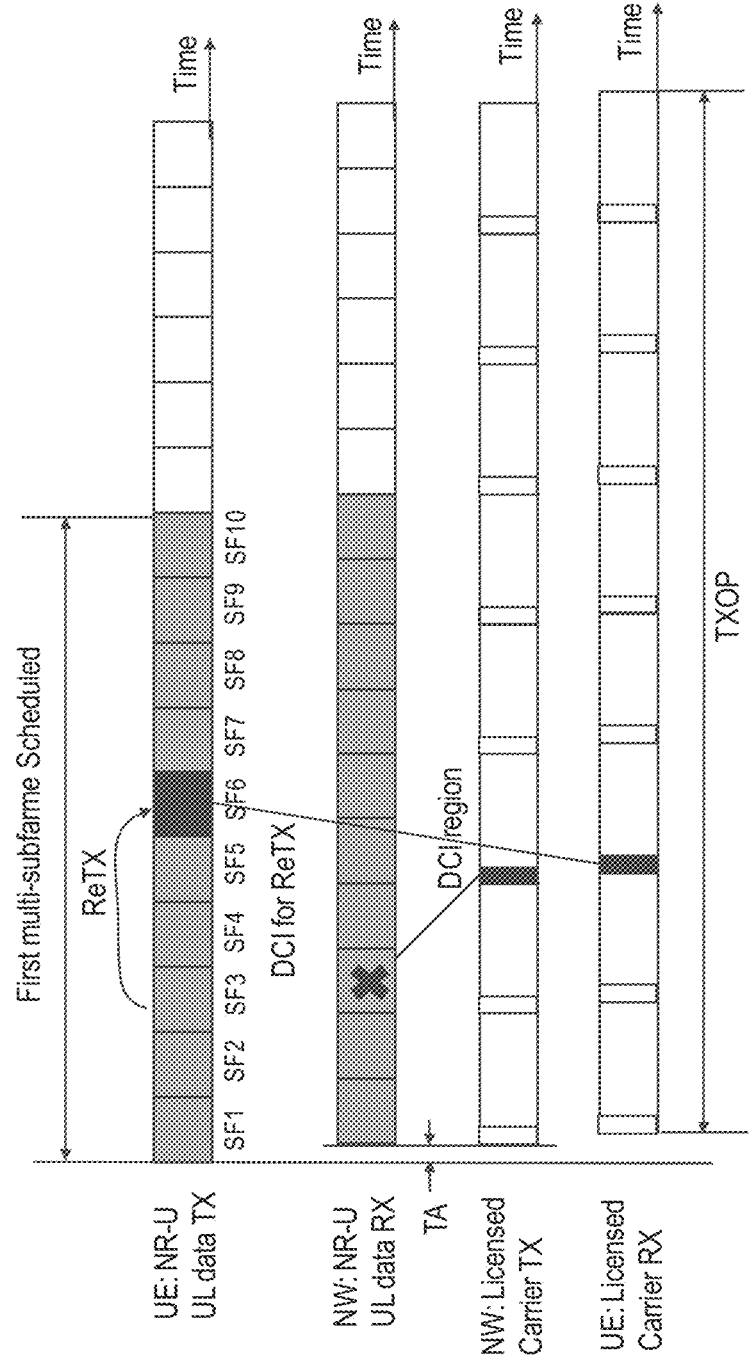
Figure 10:
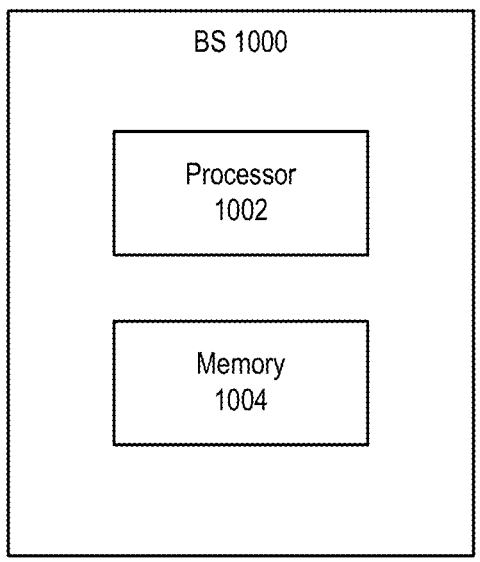
FIG. 10 is a block diagram illustrating a base station according to an embodiment of the disclosure.

FIGS. 3A and 3B are diagrams illustrating a first scheme of the disclosure. At step 302, the NW determines a first grant that schedules a first uplink transmission in a first plurality of subframes over unlicensed carrier. This step may be performed in response to the UE's transmission request. The number of the first plurality of subframes can be determined based on the MCOT and the data amount indicated in the transmission request, for example, the current available buffer size in the UE. For example, as shown in FIG. 3B, 10 subframes SF1-SF10 are scheduled for the UE.

Then, at step 304*a*, the NW transmits the first grant to the UE. This step can be performed over the unlicensed carrier. Correspondingly, at step 304*b*, the UE receives the first grant from the NW.

Then, at step 306, the UE transmits based on the first grant. This step can be performed over the unlicensed carrier. As shown in the example of FIG. 3B, the transmission by the UE starts from the subframe SF1.

During reception of the first uplink transmission, the NW detects a transmission error for a packet at step 308. For example, as shown in FIG. 3B, the UE's transmission precedes the NW's reception by a time interval equaling to the timing advance (TA) value, to compensate for the propagation delay as the radio signal travels between the UE and the NW. The packet received in SF3 is the error packet.

In response to the detected transmission error, the NW determines at step 310 a second grant that schedules a retransmission for the error packet in a subframe. The retransmission may be scheduled on an "as soon as possible (ASAP)" basis. The second grant is configured to override the first grant when the two grants conflict with each other. Thus, the second grant will override the first grant when the subframe scheduled for the retransmission overlaps with the first plurality of subframes. As shown in the example of FIG. 3B, the subframe SF6 is scheduled for the retransmission. Since SF6 overlaps with SF1-SF10, the second grant will override the first grant in SF6.

Then, at step 312*a*, the NW transmits the second grant to the UE over licensed carrier. For example, as shown in FIG. 3B, the second grant may be transmitted as downlink control information (DCI) on PDCCH. Those skilled in the art can understand that the second grant can be transmitted in any other suitable manner. Correspondingly, at step 312*b*, the UE receives the second grant from the BS over the licensed carrier.

In response to the received second grant, the UE transmits based on the second grant at step 314. Specifically, the UE retransmits the packet in the subframe as scheduled by the second grant. As mentioned above, the second grant is configured to override the first grant when the two grants conflict with each other. Thus, when the subframe scheduled for the retransmission overlaps with the first plurality of subframes, the retransmission is performed instead of the first uplink transmission. As shown in the example of FIG. 3B, since SF6 overlaps with SF1-SF10, the retransmission is performed in SF6 instead of the first uplink transmission. In the subsequent subframes SF7-SF10, since there is no conflict between the two grants, the first uplink transmission continues to be performed.

On the contrary, according to the traditional solution, the NW only reschedules the UE after the UL transmission is completed. Both the NW and the UE need to do a short LBT. During these periods, the channel may be grabbed by other UEs. There are also considerable overhead for each transmission because each short LBT wastes one slot at least.

Therefore, in the first scheme, the packet disorder due to retransmission delay in the case of multi-subframe scheduling can be reduced compared to the traditional solution. Furthermore, soft combining gain in the case of multi-subframe scheduling can also be achieved.

In the example of FIGS. 3A-3B, the subframe scheduled for the retransmission overlaps with the first plurality of subframes. However, it is also possible that they do not overlap with each other. For example, suppose the packet received in SF9 is the error packet. Then, the DCI region in SF11 is used to transmit the second grant that schedules a retransmission in SF12. Since SF12 is within the transmission opportunity (TXOP) equaling to the MCOT, the UE will perform a short LBT in SF11 before it can transmit. If the short LBT succeeds, the retransmission will be performed in SF12. In this way, only one short LBT is performed by the UE. This can reduce the probability that the channel is grabbed by other UEs, compared to the above traditional solution with two short LBT operations.

Likewise, the number of subframes scheduled for the first uplink transmission is not limited to the example of FIGS. 3A-3B. Suppose only one subframe SF6 is schedule for the first uplink transmission and the packet received in this subframe is the error packet. Then, the DCI region in SF7 is used to transmit the second grant that schedules a retransmission in SF8. Then, the UE will perform a short LBT in SF7 before it can transmit. If the short LBT succeeds, the retransmission will be performed in SF8. In this way, only one short LBT is performed by the UE. This can reduce the probability that the channel is grabbed by other UEs, compared to the above traditional solution with two short LBT operations.

In the example of FIGS. 3A-3B, the first grant is transmitted over unlicensed carrier and the second grant is transmitted over licensed carrier. However, it is also possible that the first grant is transmitted over a first licensed carrier and the second grant is transmitted over a second licensed carrier that has a different frequency than the first licensed carrier.

It should be noted that although one packet is shown to have a transmission error in the example of FIG. 3B, it is also possible that two or more successive packets are subjected to transmission errors. In this case, two or more successive subframes may be scheduled in one second grant for retransmission of those packets. Furthermore, although one retransmission is scheduled in the example of FIG. 3B, it is also possible that two or more retransmissions are scheduled. That is, steps 310, 312a, 312b and 314 may be performed one or more times within a same MCOT.

Figure 4A:
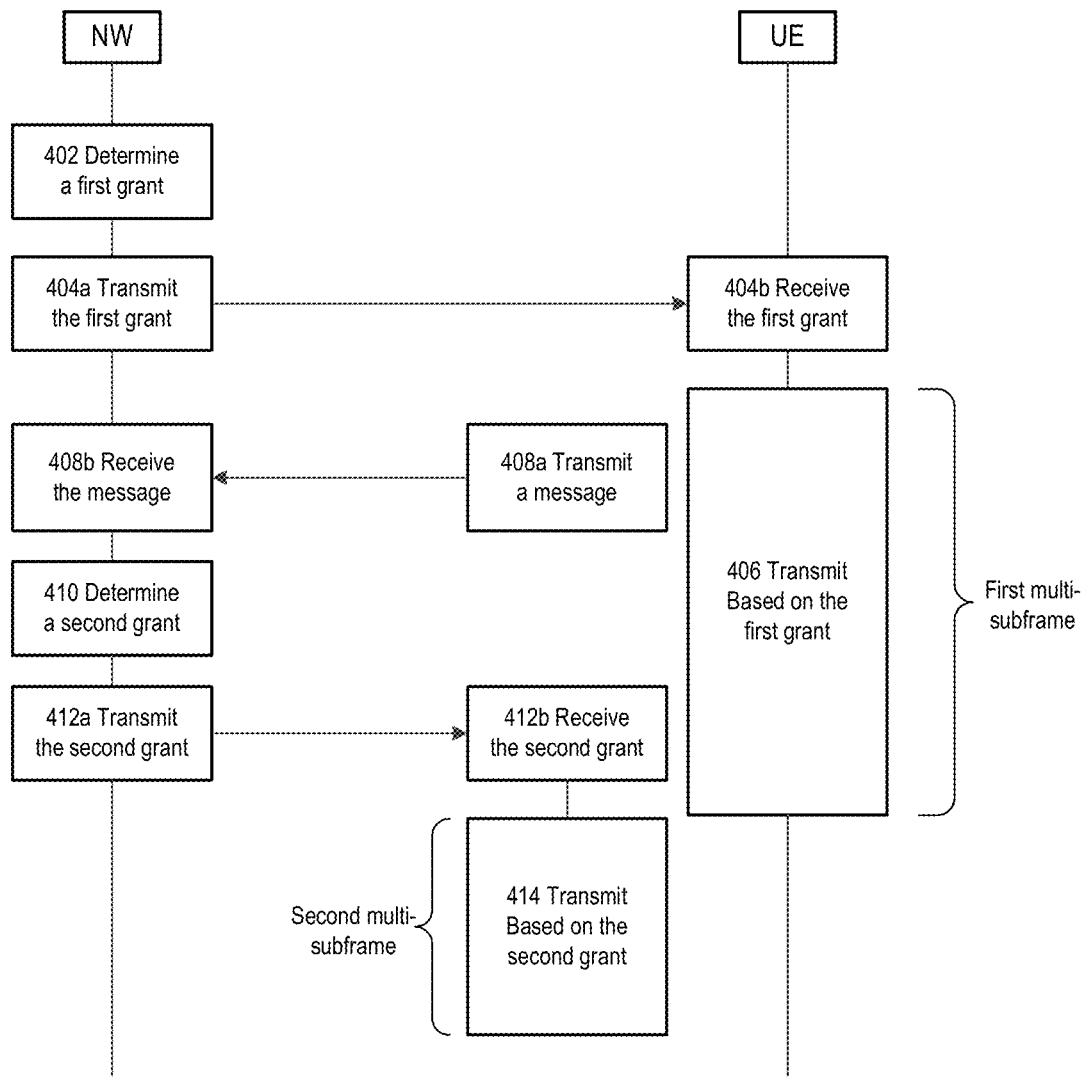
FIGS. 4A and 4B are diagrams illustrating a second scheme of the disclosure.
Figure 4B:
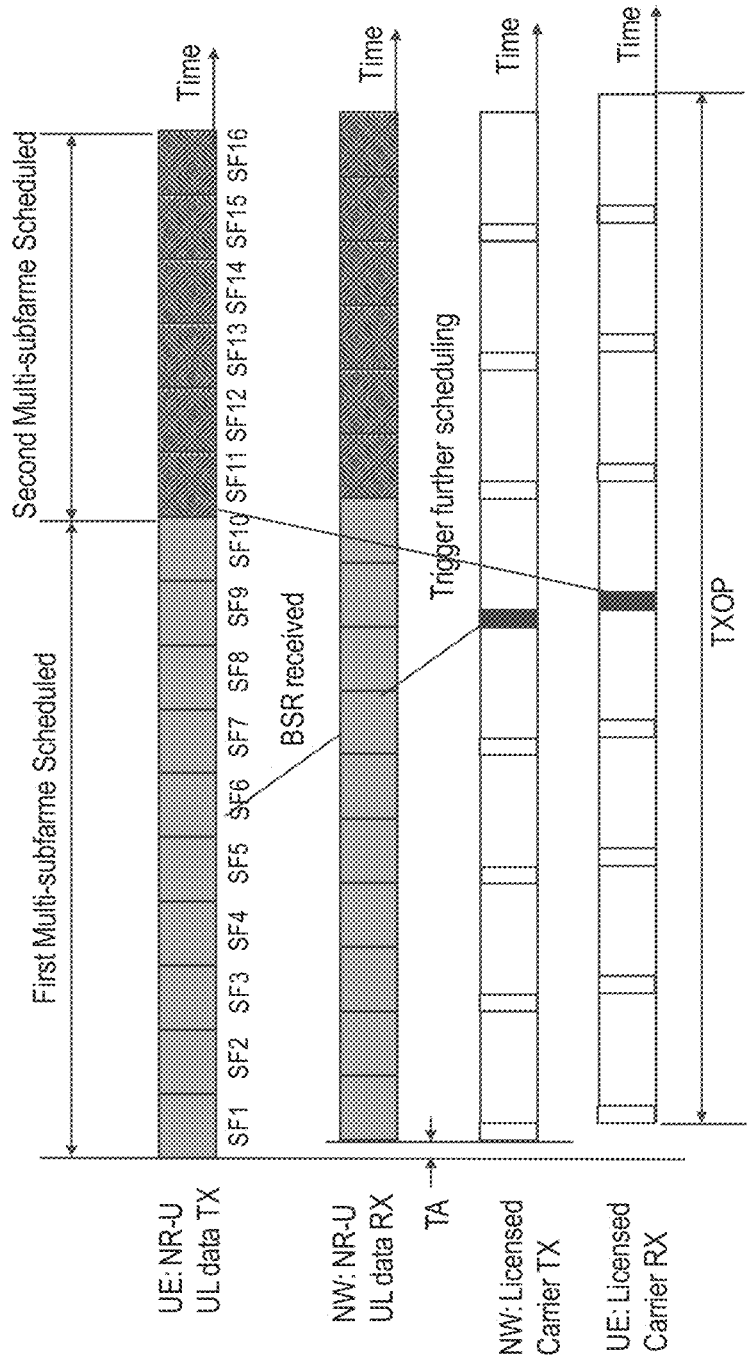

FIGS. 4A and 4B are diagrams illustrating a second scheme of the disclosure. At step 402, the NW determines a first grant that schedules a first uplink transmission in a first plurality of subframes over unlicensed carrier. Then, at step 404a, the NW transmits the first grant to the UE. Correspondingly, at step 404b, the UE receives the first grant from the NW. Then, at step 406, the UE transmits based on the first grant. Steps 402-406 of this scheme are similar to steps 302-306 of the first scheme. Detailed description about them is omitted here for brevity.

During the first uplink transmission, the UE transmits at step 408a to the NW a message indicating that the UE has additional data to transmit. This step may be performed in response to more data coming to the UE's buffer. For example, as shown in FIG. 4B, the message may be transmitted as a buffer status report (BSR) over the unlicensed carrier. Those skilled in the art can understand that the message can be transmitted in any other suitable manner. Correspondingly, at step 408b, the NW receives the message from the UE. As shown in the example of FIG. 4B, more data comes to the UE's buffer in SF6. Then, the BSR is received by the NW from the UE in SF7.

In response to the message, the NW determines at step 410 a second grant that schedules the second uplink transmission in a second plurality of subframes that are subsequent to the first plurality of subframes. The number of the second plurality of subframes can be determined based on the MCOT, the number of the first plurality of subframes and the amount of the additional data to be transmitted by the UE.

Then, at step 412a, the NW transmits the second grant to the UE over licensed carrier. Correspondingly, at step 412b, the UE receives the second grant from the BS over the licensed carrier. Steps 412a and 412b of this scheme are similar to steps 312a and 312b of the first scheme. As shown in the example of FIG. 4B, since the BSR is received in SF7, the second grant can be received by the UE from the NW in the DCI region in SF9. Thus, the second plurality of subframes can be scheduled to be immediately after the first plurality of subframes. In this example, the subframes SF11-SF16 are scheduled and the length thereof equals to the MCOT minus the length of SF1-SF10.

In response to the received second grant, the UE transmits based on the second grant at step 414. Specifically, the UE transmits the additional data in the second plurality of subframes as scheduled by the second grant. As shown in the example of FIG. 4B, the second uplink transmission is performed in SF11-SF16.

On the contrary, according to the traditional solution, if the UE has more data to transmit after the NW has already sent a UL grant to the UE, the NW schedules the UE via unlicensed carrier after the UL transmission is completed. Then, the NW has to do a LBT before sending a grant to the UE and the UE has to do another LBT before it can send UL data. During these periods, the channel may be grabbed by other UEs. Therefore, compared to the traditional solution, the second scheme can help increasing channel utilization efficiency and benefit UE performance quite a lot.

In the example of FIGS. 4A-4B, the second plurality of subframes are immediately after the first plurality of subframes. However, it is also possible that they are separated from each other. For example, suppose the BSR is received by the NW in SF9. Then, the DCI region in SF11 is used to transmit the second grant that schedules the second uplink transmission in SF12-SF16. Since SF12 is within the MCOT, the UE will perform a short LBT in SF11 before it can transmit. If the short LBT succeeds, the second uplink transmission will be performed in SF12-SF16. In this way, only one short LBT is performed by the UE. This can reduce the probability that the channel is grabbed by other UEs, compared to the above traditional solution with two short LBT operations.

Similar to the first scheme, the number of subframes scheduled for the first or second uplink transmission may equal to one. Furthermore, it is also possible that the first grant is transmitted over a first licensed carrier and the second grant is transmitted over a second licensed carrier that has a different frequency than the first licensed carrier. Furthermore, steps 410, 412a, 412b and 414 may be performed one or more times within a same MCOT.

Figure 5A:
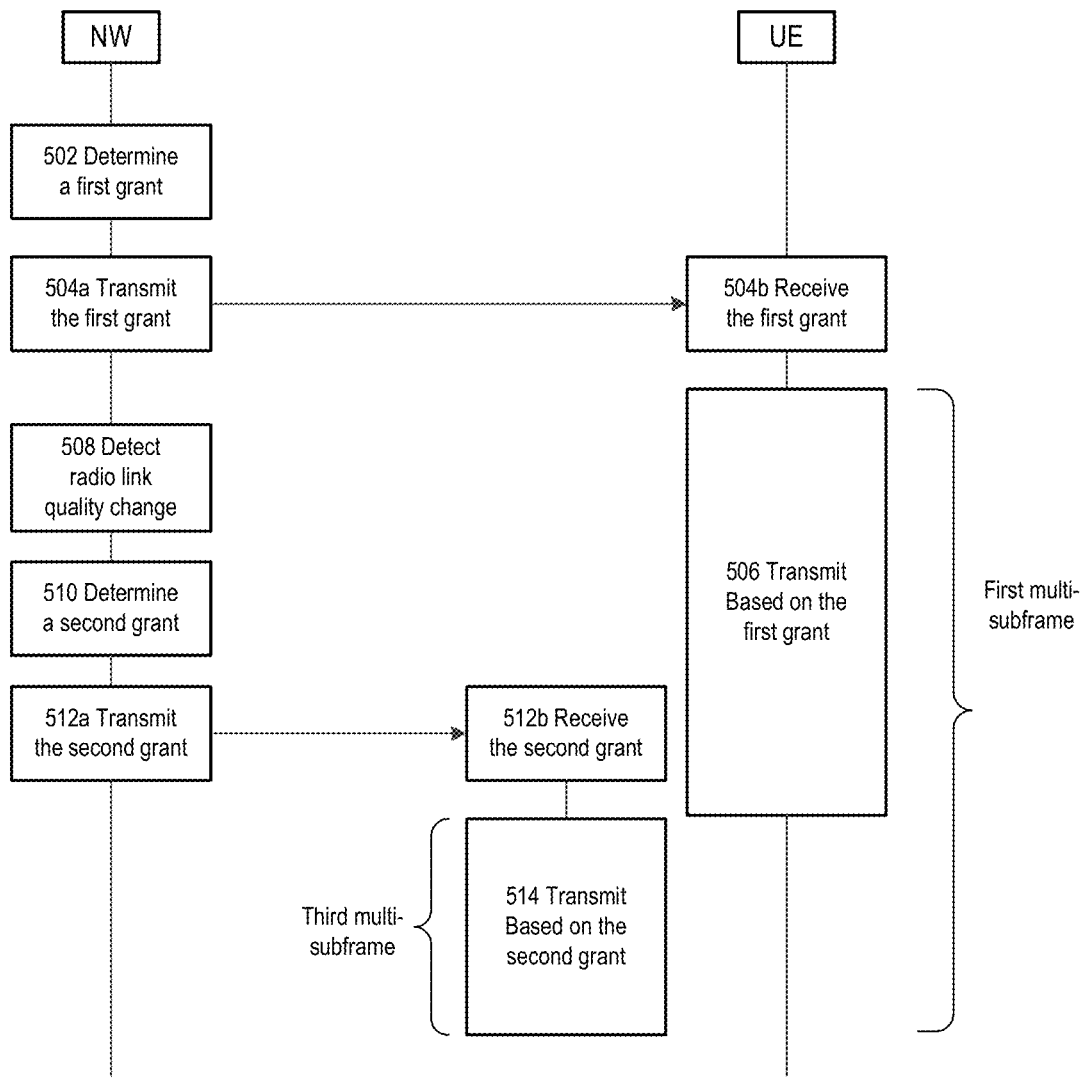
FIGS. 5A and 5B are diagrams illustrating a third scheme of the disclosure.
Figure 5B:
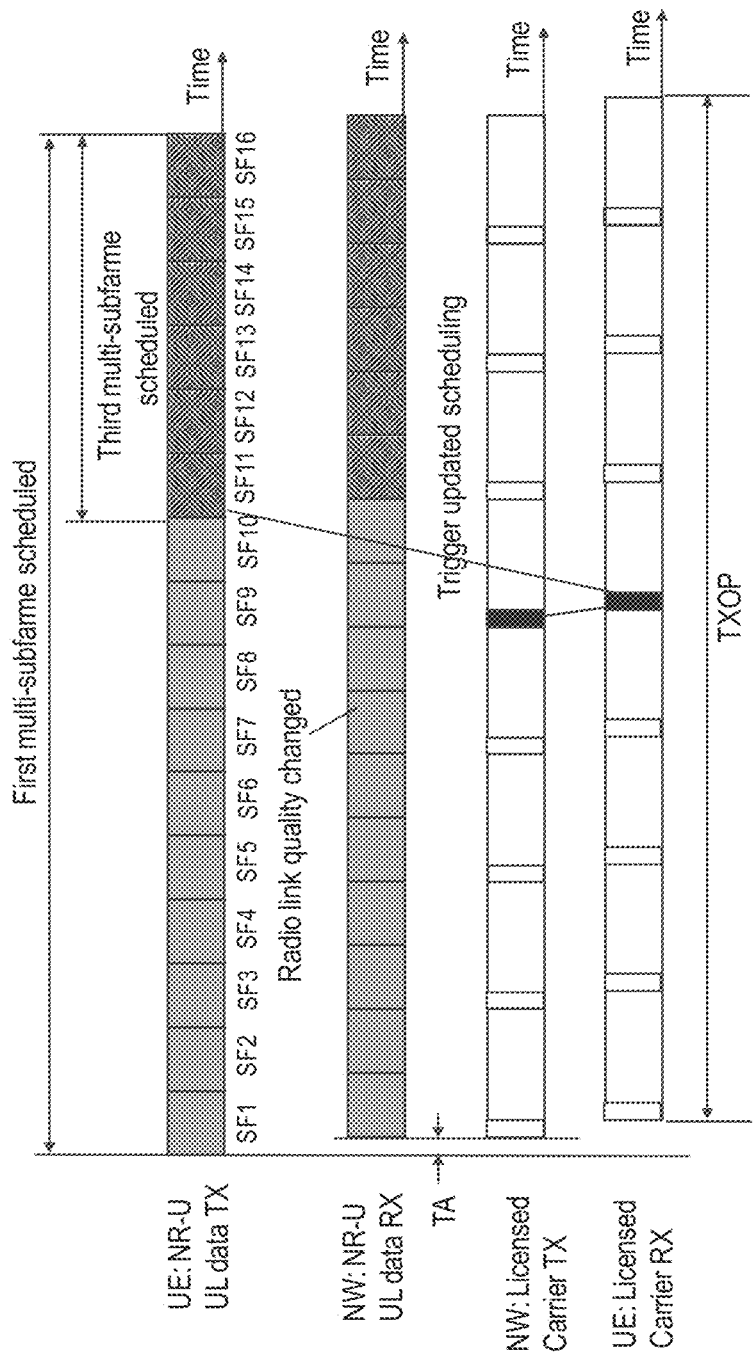

FIGS. 5A and 5B are diagrams illustrating a third scheme of the disclosure. At step 502, the NW determines a first grant that schedules a first uplink transmission in a first plurality of subframes over unlicensed carrier. This step may be similar to step 302 of the first scheme. For example, as shown in FIG. 5B, the subframes SF1-SF16 are scheduled for the first uplink transmission. Furthermore, the first grant may be determined based on current estimated radio link quality between the UE and the NW. For example, the first grant may indicate a modulation and coding scheme (MSC) corresponding to the estimated radio link quality.

Then, at step 504a, the NW transmits the first grant to the UE. Correspondingly, at step 504b, the UE receives the first grant from the NW. Then, at step 506, the UE transmits based on the first grant. Steps 504-506 of this scheme are similar to steps 304-306 of the first scheme. Detailed description about them is omitted here for brevity.

During reception of the first uplink transmission, the NW detects a change in radio link quality between the UE and the NW at step 508. This step can be performed based on the strength of signals received from the UE.

In response to the change in radio link quality, the NW determines at step 510 a second grant that schedules the second uplink transmission with an updated MSC in a third plurality of subframes. For example, this step may be performed when the change in radio link quality is greater than a predetermined threshold. The updated MSC can be determined based on the changed radio link quality. The number of the third plurality of subframes can be determined based on the MCOT and the time point at which the change in radio link quality is detected.

The second grant is configured to override the first grant when the two grants conflict with each other. Thus, the second grant will override the first grant when the third plurality of subframes overlap with the first plurality of subframes. As shown in the example of FIG. 5B, the subframes SF11-SF16 are scheduled for the second uplink transmission. Since SF11-SF16 overlap with SF1-SF16, the second grant will override the first grant in SF11-SF16.

Then, at step 512a, the NW transmits the second grant to the UE over licensed carrier. Correspondingly, at step 512b, the UE receives the second grant from the BS over the licensed carrier. Steps 512a and 512b of this scheme are similar to steps 312a and 312b of the first scheme. As shown in the example of FIG. 5B, since the radio quality change is detected in SF7, the second grant can be received by the UE from the NW in the DCI region in SF9. Suppose the processing time for the UE to change the MSC is one subframe. Then, SF11-SF16 can be scheduled for the second uplink transmission.

In response to the received second grant, the UE transmits based on the second grant at step 514. Specifically, the UE transmits with the updated MSC in the third plurality of subframes. As mentioned above, the second grant is configured to override the first grant when the two grants conflict with each other. Since the third plurality of subframes overlap with the first plurality of subframes, the UE transmits in the third plurality of subframes by using the updated MSC instead of the original MSC. As shown in the example of FIG. 5B, since SF11-SF16 overlap with SF1-SF16, the updated MSC is used in SF11-SF16 instead of the original MSC. In this way, the third scheme can help increasing channel utilization efficiency and benefit UE performance quite a lot.

Similar to the second scheme, the number of subframes scheduled for the third uplink transmission may equal to one. Furthermore, it is also possible that the first grant is transmitted over a first licensed carrier and the second grant is transmitted over a second licensed carrier that has a different frequency than the first licensed carrier. Furthermore, steps 510, 512a, 512b and 514 may be performed one or more times within a same MCOT.

To sum up, in the first to third schemes described above, unlicensed carrier can be scheduled by both self-carrier scheduling and cross-carrier scheduling. The self-carrier scheduling is mainly used to grab the channel. Since UL grant and UL transmission will be within one MCOT, using self-carrier scheduling, a UE does not need to do a regular LBT but a short LBT (25 μs) on unlicensed carrier anymore, once it receives an UL grant from the same unlicensed carrier. The cross-carrier scheduling is mainly used for a UE to further enhance transmission in the same MCOT. This is because once the UE starts to transmit in UL, it cannot receive any message from the NW anymore on the same unlicensed carrier due to time division duplexing (TDD) operation in unlicensed carrier. Therefore, when something happens, the NW notifies the UE of such information via licensed carrier. This enables the UE to get updated information and continue to use the same MCOT window.

It should be noted that the first to third schemes can also be applied for licensed operation. Specifically, a UE initially receives a single-subframe or multi-subframe UL scheduling grant from a first carrier such as a first licensed carrier. Such UL scheduling grant may or may not span the whole MCOT. During the UE's uplink transmission in the first carrier, if certain trigger event happens (e.g., the NW has detected a transmission error, or the NW has detected the UE has more data to transmit in uplink, or the NW has detected a radio quality change, and so on), the NW sends a scheduling grant to the UE via a second carrier such as a second licensed carrier, to ask the UE either to retransmit, or continue transmission, or transmit with an updated MCS in that MCOT. Then UE either retransmits the error packet in the same transmission opportunity as the initial transmission, or transmit more data in the same transmission opportunity, or transmit with a new MCS.

Figure 6:
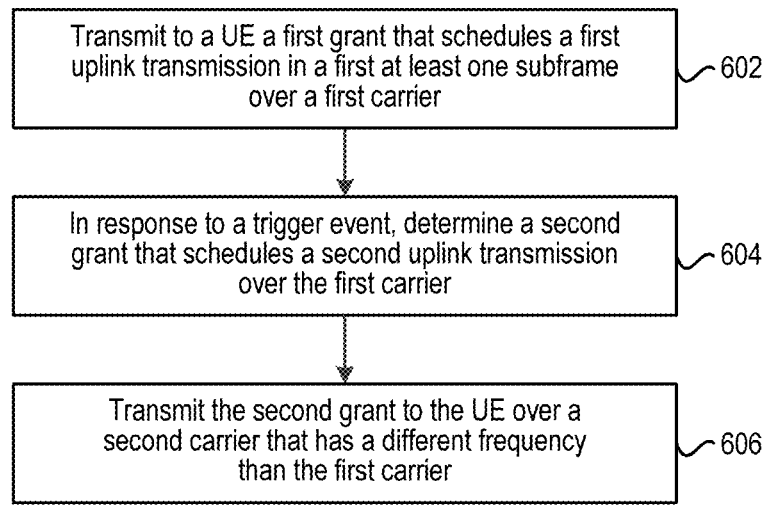
FIG. 6 is a flowchart illustrating a method for uplink transmission control according to an embodiment of the disclosure.

FIG. 6 is a flowchart illustrating a method for uplink transmission control according to an embodiment of the disclosure. The method may be performed by a BS such as gNB. At step 602, a first grant is transmitted to a UE. The first grant schedules a first uplink transmission in a first at least one subframe over a first carrier. This step may be similar to step 304a of FIG. 3A, step 404a of FIG. 4A and step 504a of FIG. 5A. The first at least one subframe may be the first plurality of subframes or a single subframe, as described above. The first carrier may be unlicensed carrier or a first licensed carrier, as described above.

Then, at step 604, in response to a trigger event, a second grant is determined. The second grant schedules a second uplink transmission over the first carrier. This step may be similar to steps 308-310 of FIG. 3A, steps 408b and 410 of FIG. 4A and steps 508-510 of FIG. 5A.

Then, at step 606, the second grant is transmitted to the UE over a second carrier that has a different frequency than the first carrier. This step may be similar to step 312a of FIG. 3A, step 412a of FIG. 4A and step 512a of FIG. 5A. The second carrier may be licensed carrier or a second licensed carrier, as described above.

Figure 7:
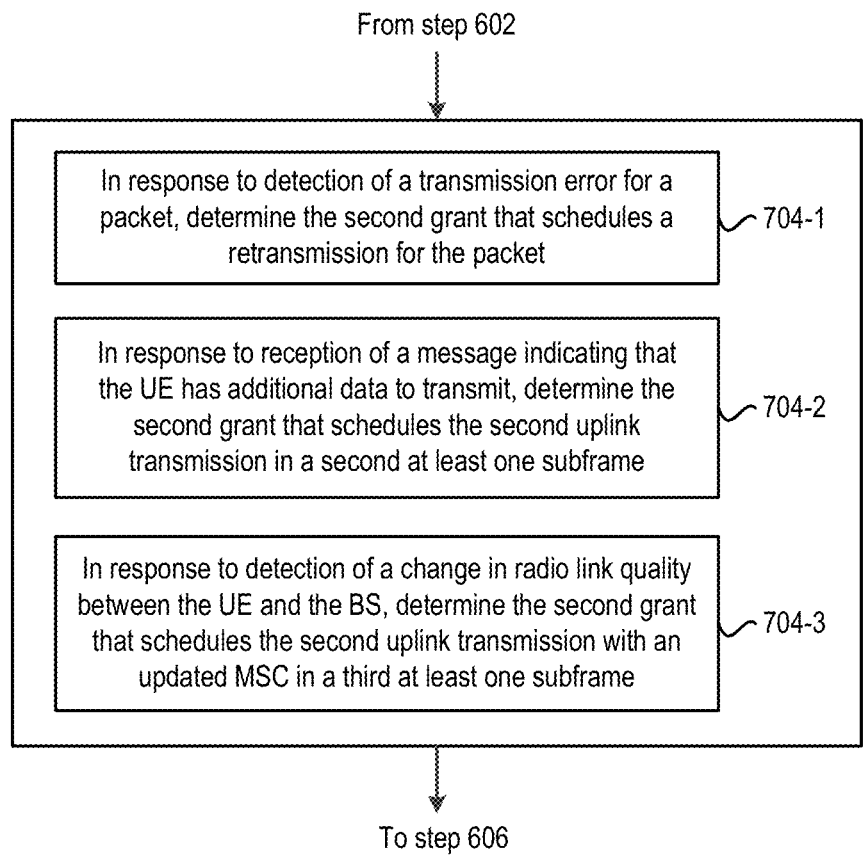
FIG. 7 is a flowchart for explaining the method of FIG. 6.

FIG. 7 is a flowchart for explaining the method of FIG. 6. As shown, step 604 of FIG. 6 may be implemented as any one of steps 704-1, 704-2 and 704-3 or a combination thereof. At step 704-1, in response to detection of a transmission error for a packet during reception of the first uplink transmission, the second grant is determined that schedules a retransmission for the packet in a subframe that is subsequent to the detection. This step corresponds to steps 308-310 of the first scheme.

At step 704-2, in response to reception from the UE of a message indicating that the UE has additional data to transmit, the second grant is determined that schedules the second uplink transmission in a second at least one subframe that is subsequent to the first at least one subframe. This step corresponds to steps 408b and 410 of the second scheme.

At step 704-3, in response to detection of a change in radio link quality between the UE and the BS during reception of the first uplink transmission, the second grant is determined that schedules the second uplink transmission with an updated MSC in a third at least one subframe. This step corresponds to steps 508-510 of the third scheme.

Figure 8:
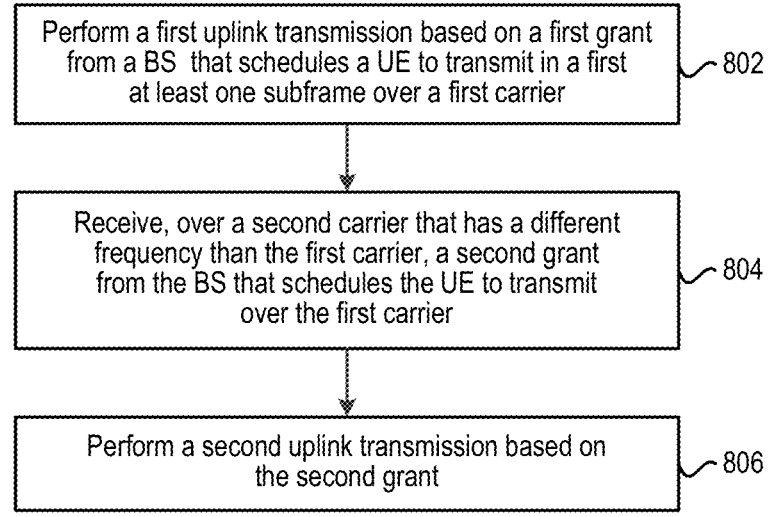
FIG. 8 is a flowchart illustrating a method for uplink transmission according to an embodiment of the disclosure.

FIG. 8 is a flowchart illustrating a method for uplink transmission according to an embodiment of the disclosure. This method may be performed by a UE. At step 802, a first uplink transmission is performed based on a first grant from a BS. The first grant schedules the UE to transmit in a first at least one subframe over a first carrier. This step may be similar to step 306 of FIG. 3A, step 406 of FIG. 4A and step 506 of FIG. 5A. Similar to the method of FIG. 6, the first at least one subframe may be the first plurality of subframes or a single subframe, as described above. The first carrier may be unlicensed carrier or a first licensed carrier, as described above.

At step 804, a second grant is received from the BS over a second carrier that has a different frequency than the first carrier. The second grant schedules the UE to transmit over the first carrier. This step may be similar to step 312b of FIG. 3A, step 412b of FIG. 4A and step 512b of FIG. 5A. Similar to the method of FIG. 6, the second carrier may be licensed carrier or a second licensed carrier, as described above.

At step 806, a second uplink transmission is performed based on the second grant. This step may be similar to step 314 of FIG. 3A, step 414 of FIG. 4A and step 514 of FIG. 5A.

Figure 9:
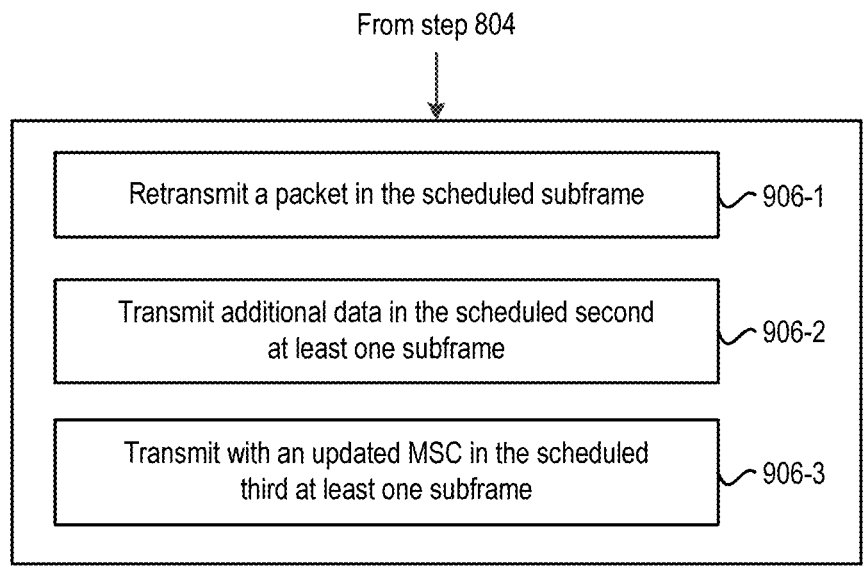
FIG. 9 is a flowchart for explaining the method of FIG. 8.

FIG. 9 is a flowchart for explaining the method of FIG. 8. As shown, step 806 of FIG. 8 may be implemented as any one of steps 906-1, 906-2 and 906-3 or a combination thereof. Step 906-1 corresponds to the second grant that schedules a retransmission for a packet in a subframe. Correspondingly, at step 906-1, the packet is retransmitted in the subframe. This step corresponds to step 314 of the first scheme. In the example of FIG. 3B, the first uplink transmission is performed in the subframes SF1-SF5 and SF7-SF10, while the second uplink transmission is performed in SF6.

Step 906-2 corresponds to the second grant that schedules the UE to transmit in a second at least one subframe that is subsequent to the first at least one subframe. Correspondingly, at step 906-2, additional data is transmitted in the second at least one subframe. This step corresponds to step 414 of the second scheme. In the example of FIG. 4B, the first uplink transmission is performed in the subframes SF1-SF10, while the second uplink transmission is performed in SF11-SF16.

Step 906-3 corresponds to the second grant that schedules the UE to transmit with an updated MSC in a third at least one subframe. Correspondingly, at step 906-3, the UE transmits with the updated MSC in the third at least one subframe. This step corresponds to step 514 of the third scheme. In the example of FIG. 5B, the first uplink transmission is performed in the subframes SF1-SF10, while the second uplink transmission is performed in SF11-SF16.

FIG. 10 is a block diagram illustrating a base station according to an embodiment of the disclosure. As shown, the base station 1000 comprises a processor 1002 and a memory 1004. The memory 1004 contains instructions which may be executed by the processor 1002 to cause the base station 1000 to perform the method steps described above with reference to FIGS. 6 and 7. Besides, the other configurations of the base station 1000 may be well known to those skilled in the art, and thus the detailed description thereof is omitted here.

As another embodiment, a base station may comprise a first transmission module, a determination module and a second transmission module. The first transmission module is configured to transmit to a UE a first grant that schedules a first uplink transmission in a first at least one subframe over a first carrier. The determination module is configured to, in response to a trigger event, determine a second grant that schedules a second uplink transmission over the first carrier. The second transmission module is configured to transmit the second grant to the UE over a second carrier that has a different frequency than the first carrier.

As an example, the trigger event is detection of a transmission error for a packet during reception of the first uplink transmission. The determination module is configured to determine the second grant that schedules a retransmission for the packet in a subframe that is subsequent to the detection.

As another example, the trigger event is reception from the UE of a message indicating that the UE has additional data to transmit. The determination module is configured to determine the second grant that schedules the second uplink transmission in a second at least one subframe that is subsequent to the first at least one subframe.

As still another example, the trigger event is detection of a change in radio link quality between the UE and the BS during reception of the first uplink transmission. The determination module is configured to determine the second grant that schedules the second uplink transmission with an updated MSC in a third at least one subframe.

Figure 11:
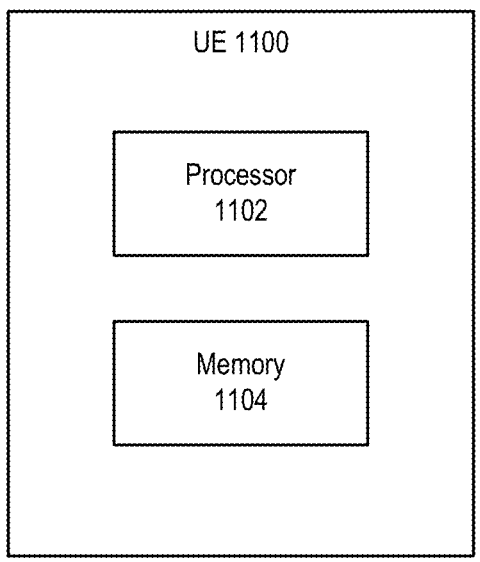
FIG. 11 is a block diagram illustrating a user equipment according to an embodiment of the disclosure.

FIG. 11 is a block diagram illustrating a user equipment according to an embodiment of the disclosure. As shown, the user equipment 1100 comprises a processor 1102 and a memory 1104. The memory 1104 contains instructions which may be executed by the processor 1102 to cause the user equipment 1100 to perform the method steps described above with reference to FIGS. 8 and 9. Besides, the other configurations of the user equipment 1100 may be well known to those skilled in the art, and thus the detailed description thereof is omitted here.

As another embodiment, a user equipment may comprise a first uplink transmission module, a reception module and a second uplink transmission module. The first uplink transmission module is configured to perform a first uplink transmission based on a first grant from a BS. The first grant schedules the UE to transmit in a first at least one subframe over a first carrier. The reception module is configured to receive a second grant from the BS over a second carrier that has a different frequency than the first carrier. The second grant schedules the UE to transmit over the first carrier. The second uplink transmission module is configured to perform a second uplink transmission based on the second grant.

As an example, the second grant schedules a retransmission for a packet in a subframe. The second uplink transmission module is configured to retransmit the packet in the subframe.

As another example, the UE further comprises a message transmission module configured to transmit to the BS a message indicating that the UE has additional data to transmit. The second grant schedules the UE to transmit in a second at least one subframe that is subsequent to the first at least one subframe. The second uplink transmission module is configured to transmit the additional data in the second at least one subframe.

As still another example, the second grant schedules the UE to transmit with an updated MSC in a third at least one subframe. The second uplink transmission module is configured to transmit with the updated MSC in the third at least one subframe.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method for uplink transmission control at a base station (BS), comprising:
    transmitting to a user equipment (UE) a first grant that schedules a first uplink transmission in a first at least one subframe over a first carrier;
    in response to a trigger event, determining a second grant that schedules a second uplink transmission over the first carrier; and
    transmitting the second grant to the UE over a second carrier that has a different frequency than the first carrier, wherein the second grant is configured to override the first grant when the two grants conflict with each other.

2. The method according to claim 1, wherein the determining a second grant and the transmitting the second grant are performed one or more times; and
    wherein the first uplink transmission and the one or more second uplink transmissions are scheduled to be within a same maximum channel occupation time (MCOT).

3. The method according to claim 1, wherein the trigger event is detection of a transmission error for a packet during reception of the first uplink transmission; and
    wherein the step of determining comprises determining the second grant that schedules a retransmission for the packet in a subframe that is subsequent to the detection.

4. The method according to claim 1, wherein the trigger event is reception from the UE of a message indicating that the UE has additional data to transmit; and
    wherein the step of determining comprises determining the second grant that schedules the second uplink transmission in a second at least one subframe that is subsequent to the first at least one subframe.

5. The method according to claim 1, wherein the trigger event is detection of a change in radio link quality between the UE and the BS during reception of the first uplink transmission; and
    wherein the step of determining comprises determining the second grant that schedules the second uplink transmission with an updated modulation and coding scheme (MSC) in a third at least one subframe.

6. The method according to claim 1, wherein both the first and second carriers have licensed frequencies; or
    wherein the first carrier has an unlicensed frequency and the second carrier has a licensed frequency.

7. A computer program product comprising a non-transitory computer readable medium storing instructions which when executed by at least one processor, cause the at least one processor to perform the method according to claim 1.

8. A method for uplink transmission at a user equipment (UE), comprising:
    determining whether a first grant received from a base station (BS) conflicts with a second grant received from the BS, wherein the first grant schedules the UE to transmit in a first at least one subframe over a first carrier, and wherein the second grant is received from the BS over a second carrier that has a different frequency than the first carrier, the second grant scheduling the UE to transmit over the first carrier;
    when the first grant does not conflict with the second grant, performing a first uplink transmission based on the first grant from the BS;
    when the first grant does conflict with the second grant, performing a second uplink transmission based on the second grant.

9. The method according to claim 8, wherein the receiving a second grant and the performing a second uplink transmission are performed one or more times; and
    wherein the first uplink transmission and the one or more second uplink transmissions are performed within a same maximum channel occupation time (MCOT).

10. The method according to claim 8, wherein the second grant schedules a retransmission for a packet in a subframe; and
    wherein performing the second uplink transmission based on the second grant comprises retransmitting the packet in the subframe.

11. The method according to claim 8, further comprising transmitting to the BS a message indicating that the UE has additional data to transmit;
    wherein the second grant schedules the UE to transmit in a second at least one subframe that is subsequent to the first at least one subframe; and
    wherein performing the second uplink transmission based on the second grant comprises transmitting the additional data in the second at least one subframe.

12. The method according to claim 8, wherein the second grant schedules the UE to transmit with an updated modulation and coding scheme (MSC) in a third at least one subframe; and wherein performing the second uplink transmission based on the second grant comprises transmitting with the updated MSC in the third at least one subframe.

13. The method according to claim 8, wherein both the first and second carriers have licensed frequencies; or wherein the first carrier has an unlicensed frequency and the second carrier has a licensed frequency.

14. A computer program product comprising a non-transitory computer readable medium storing instructions which when executed by at least one processor, cause the at least one processor to perform the method according to claim 8.

15. A base station (BS) capable of uplink transmission control, comprising:

a processor; and a memory, the memory containing instructions executable by the processor, whereby the BS is operative to:

transmit to a user equipment (UE) a first grant that schedules a first uplink transmission in a first at least one subframe over a first carrier;

in response to a trigger event, determine a second grant that schedules a second uplink transmission over the first carrier; and transmit the second grant to the UE over a second carrier that has a different frequency than the first carrier, wherein the second grant is configured to override the first grant when the two grants conflict with each other.

16. A user equipment (UE) capable of uplink transmission, comprising:

a processor; and a memory, the memory containing instructions executable by the processor, whereby the UE is operative to:

determine whether a first grant received from a base station (BS) conflicts with a second grant received from the BS, wherein the first grant schedules the UE to transmit in a first at least one subframe over a first carrier, and wherein the second grant is received from the BS over a second carrier that has a different frequency than the first carrier, the second grant scheduling the UE to transmit over the first carrier;

when the first grant does not conflict with the second grant, perform a first uplink transmission based on the first grant from the BS;

when the first grant does conflict with the second grant, perform a second uplink transmission based on the second grant.

* * * * *